United States Patent
Heideman et al.

(10) Patent No.: US 7,157,827 B2
(45) Date of Patent: Jan. 2, 2007

(54) SPOKE PERMANENT MAGNET ROTOR

(75) Inventors: Robert J. Heideman, Kewaskum, WI (US); Dan M. Ionel, Fox Point, WI (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 10/945,759

(22) Filed: Sep. 21, 2004

(65) Prior Publication Data

US 2006/0061227 A1  Mar. 23, 2006

(51) Int. Cl.
*H02K 1/06* (2006.01)
*H02K 1/27* (2006.01)
*H02K 21/12* (2006.01)

(52) U.S. Cl. ............ 310/217; 310/156.53; 310/156.56; 310/156.47

(58) Field of Classification Search ............... 310/216, 310/217, 218, 43, 156.47, 261, 156.08, 156.53, 310/156.56
See application file for complete search history.

(56) References Cited

U.S. PATENT DOCUMENTS

| | | | |
|---|---|---|---|
| 2,059,518 A * | 11/1936 | Harley ................. | 310/156.53 |
| 3,872,334 A | 3/1975 | Loubier | |
| 4,059,898 A | 11/1977 | Adair | |
| 4,631,807 A | 12/1986 | Kawada et al. | |
| 4,954,736 A | 9/1990 | Kawamoto et al. | |
| 4,977,344 A * | 12/1990 | Obradovic ................. | 310/217 |
| 5,010,266 A | 4/1991 | Uchida | |
| 5,023,502 A | 6/1991 | Johnson | |
| 5,091,668 A * | 2/1992 | Cuenot et al. ......... | 310/156.61 |
| 5,140,211 A | 8/1992 | Uchida | |
| 5,157,297 A | 10/1992 | Uchida | |
| 5,200,662 A | 4/1993 | Tagami et al. | |
| 5,463,262 A | 10/1995 | Uchida | |
| 5,500,994 A | 3/1996 | Itaya | |
| 5,806,169 A | 9/1998 | Trago et al. | |
| 5,818,141 A | 10/1998 | Cho et al. | |
| 5,990,592 A * | 11/1999 | Miura et al. ........... | 310/156.53 |
| 6,265,802 B1 | 7/2001 | Getschmann | |
| 6,426,576 B1 * | 7/2002 | Varenne ................. | 310/156.09 |
| 6,452,301 B1 | 9/2002 | VanDine et al. | |
| 6,657,349 B1 * | 12/2003 | Fukushima ............ | 310/156.47 |
| 6,674,213 B1 * | 1/2004 | Berger ........................ | 310/261 |
| 6,707,209 B1 * | 3/2004 | Crapo et al. ........... | 310/156.43 |
| 6,876,115 B1 * | 4/2005 | Takahashi et al. ...... | 310/156.47 |
| 2003/0052561 A1 | 3/2003 | Rahman et al. | |
| 2003/0214194 A1 | 11/2003 | Carl, Jr. et al. | |
| 2003/0222514 A1 | 12/2003 | VanDine et al. | |
| 2004/0004407 A1 * | 1/2004 | Laurent et al. ......... | 310/156.48 |
| 2004/0124728 A1 * | 7/2004 | Yamaguchi et al. ... | 310/156.25 |

FOREIGN PATENT DOCUMENTS

| FR | 2 542 519 | 9/1984 |
|---|---|---|
| GB | 2 275 134 | 8/1994 |

* cited by examiner

*Primary Examiner*—Tran Nguyen
(74) *Attorney, Agent, or Firm*—Michael Best & Friedrich LLP

(57) ABSTRACT

A spoke permanent magnet rotor that includes a shaft defining a rotor axis. A first non-magnetic end portion is coupled to the shaft and a ferromagnetic pole piece defines an aperture therethrough. A second non-magnetic end portion is positioned to dispose the pole piece between the first end portion and the second end portion. A portion of one of the first end portion and the second end portion extends through the aperture and bonds with the other of the first end portion and the second end portion.

19 Claims, 7 Drawing Sheets

SPOKE PERMANENT MAGNET ROTOR

BACKGROUND

The invention relates to a rotor for an electric machine and a method of manufacturing and assembling the rotor. More particularly the invention relates to a spoke permanent magnet rotor for a motor and a method of manufacturing and assembling the spoke permanent magnet rotor.

SUMMARY

In one embodiment, the invention provides a rotor that includes a shaft defining a rotor axis. A first end portion is coupled to the shaft and a pole piece defines an aperture therethrough. A second end portion is positioned to dispose the pole piece between the first end portion and the second end portion. A portion of one of the first end portion and the second end portion extends through the aperture and bonds with the other of the first end portion and the second end portion.

In another embodiment, the invention provides an electric machine that includes a stator and a rotor disposed to interact with the stator. The rotor includes a shaft that extends along a rotor axis. A first end portion is coupled to the shaft and a plurality of pole pieces are arranged circumferentially around the shaft. Each of the plurality of pole pieces defines an aperture therethrough. A second end portion is positioned to sandwich the plurality of pole pieces between the first end portion and the second end portion. A portion of one of the first end portion and the second end portion extends through each of the apertures and bonds with the other of the first end portion and the second end portion. A bearing at least partially supports the rotor shaft for rotation about the rotor axis.

The invention also provides a method of manufacturing a rotor. The method includes providing a plurality of pole pieces, each of the pole pieces including an aperture. The method also includes arranging the plurality of pole pieces around an axis, forming a first end portion, and forming a second end portion such that a portion of at least one of the first end portion and the second end portion passes through the aperture and bonds with the other of the first end portion and the second end portion.

Other aspects and embodiments of the invention will become apparent by consideration of the detailed description and accompanying drawings.

BRIEF DESCRIPTION OF THE DRAWING

The detailed description particularly refers to the accompanying figures in which.

DETAILED DESCRIPTION

Before any embodiments of the invention are explained in detail, it is to be understood that the invention is not limited in its application to the details of construction and the arrangement of components set forth in the following description or illustrated in the following figures. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 1:
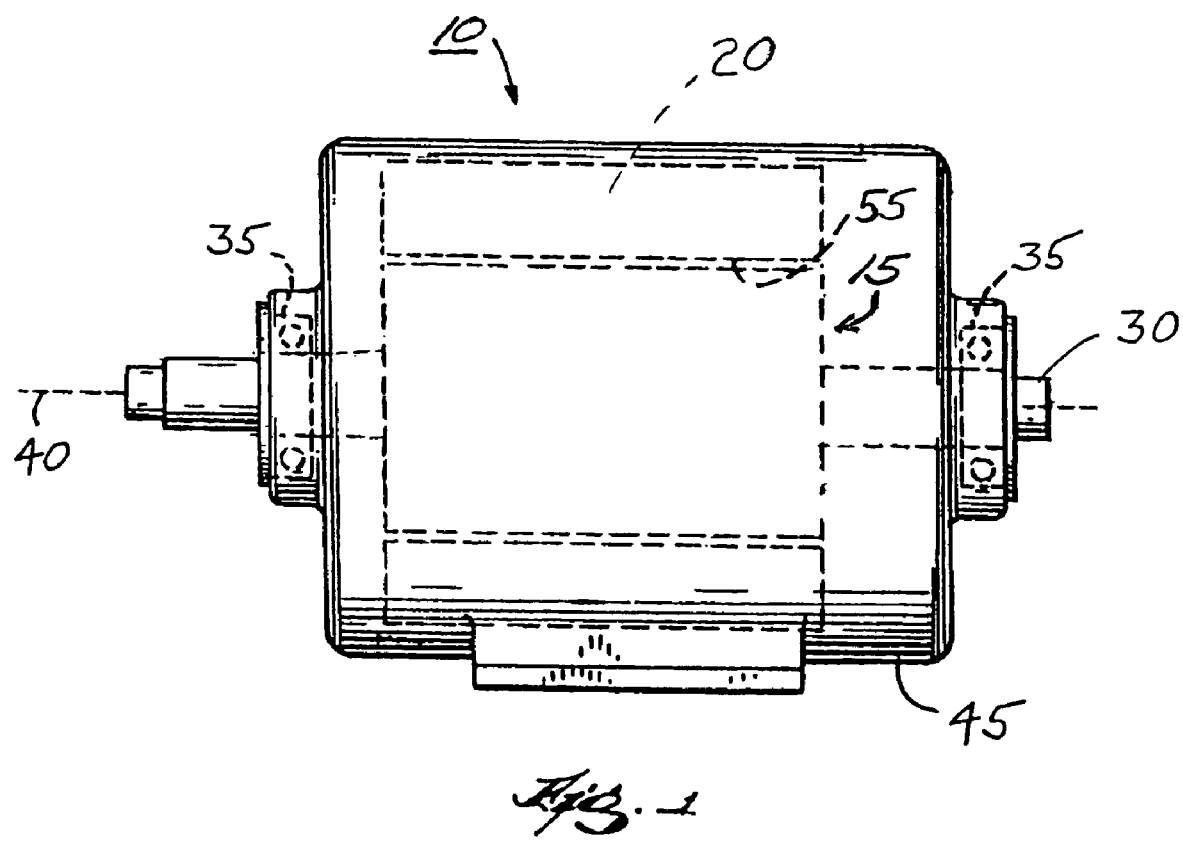
FIG. 1 is an axial schematic view of an electric motor including a stator.

As shown in FIG. 1, a motor 10 generally includes a rotor 15 disposed within a stator 20. The rotor 15 includes a core 25 and a shaft 30 that extends from one or both ends of the core 25 to provide support points and to provide a convenient shaft power take off point. Typically, the shaft 30 is mechanically coupled to a component to be driven by the motor 10 (e.g., pump, compressor, drive train, etc.).

Generally, one or more bearings 35 engage the rotor shaft 30 and support the rotor 15 such that it rotates about a rotational axis 40. The stator 20 is generally fitted into a housing 45. The stator 20 defines a substantially cylindrical aperture, or bore 55 as it is commonly referred to in the motor art, centered on the rotational axis 40. When the rotor 15 is in its operating position relative to the stator 20, a small air gap is established between the rotor and the stator. The air gap allows for relatively free rotation of the rotor 15 within the stator 20.

The motor 10 illustrated in FIG. 1 is a brushless permanent magnet motor. As such, the rotor 15 includes permanent magnets 60 (one magnet shown in FIG. 3) that define two or more magnetic poles resulting in a magnetic field. The stator 20 includes one or more coils that can be selectively energized to produce a magnetic field. The magnetic field of the rotor 15 interacts with the magnetic field of the stator 20 to produce electromagnetic torque and rotor rotation. As one of ordinary skill will realize, the invention is well suited to many types of motors, in addition to the brushless permanent magnet motors illustrated herein. As such, the invention should not be limited to only these types of motors. Furthermore, one of ordinary skill will realize that the invention can also be applied to many types of generators. In addition, the figures and description presented herein are directed to a rotor and/or a motor. Thus, while the figures and description refer to a brushless permanent magnet motor and/or a rotor, other applications are possible.

Figure 2:
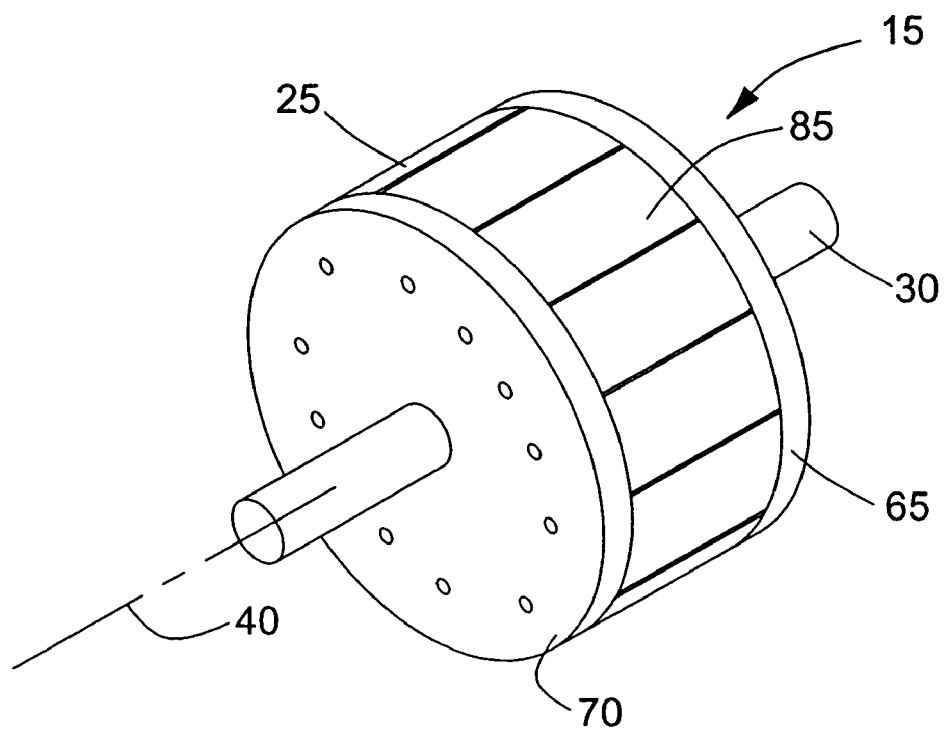
FIG. 2 is a perspective view of a rotor of FIG. 1.

FIG. 2 illustrates an assembled rotor 15 suitable for use with the motor 10 of FIG. 1. The rotor 15 includes a first end portion 65, a second end portion 70, the rotor shaft 30, and the core 25. The first end portion 65 and the second end portion 70 are illustrated as being disc shaped. However, other shapes, such as polygons, could also be used to define the first end portion 65 and/or the second end portion 70 if desired.

Figure 3:
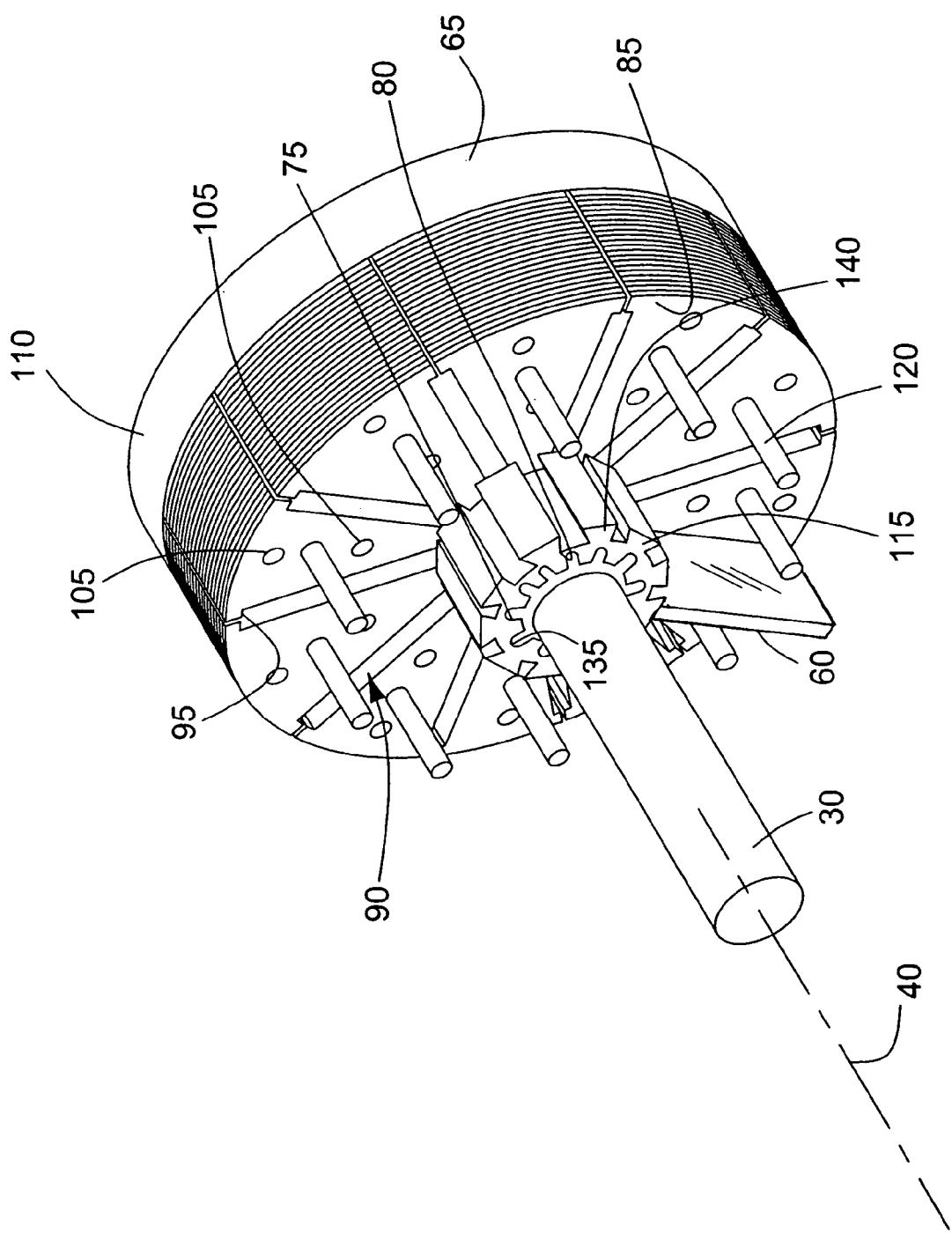
FIG. 3 is a perspective view of a portion of the rotor of FIG. 2.

In some constructions, the rotor 15 includes a hub 75 positioned adjacent and surrounding the shaft 30 as illustrated in FIG. 3. The hub 75 includes a plurality of outward extending teeth 80 that resemble gear teeth. The hub 75 can have other shapes and can be formed from any material with plastic being preferred. A relatively soft plastic can be used to absorb and dampen torsional vibrations created during motor operation due to the cogging and ripple torque. The hub 75 is generally attached, preferably by injection molding, to the shaft 30 such that the two rotate in unison. To enhance the mechanical contact between the hub 75 and the shaft 30, the shaft surface can be knurled or can include undercuts. Other suitable attachment methods (e.g., key, screw, pin, etc.) can be used to attach the hub 75 to the shaft 30. In another construction, the hub 75 is formed as part of the shaft 30 or of the end portion 65.

The rotor core 25 illustrated in FIG. 3 includes a plurality of pole pieces 85 and a plurality of permanent magnets 60 arranged circumferentially around the rotor shaft 30. The pole pieces 85 are positioned to define radially extending slots 90 that are spaced from one another around the rotational axis 40. The slots 90 are generally substantially rectangular openings sized to receive and retain the permanent magnets 60. Thus, the permanent magnets 60 are arranged around the rotor shaft 30 and extend substantially radially such that they resemble spokes in a wheel. In order to minimize the magnetic flux leakage, the pole-pieces 85 and the permanent magnets 60 are radially spaced from shaft 30, which can be made of ferromagnetic steel. In the construction illustrated in FIG. 3, the pole pieces 85 include hook portions 95 adjacent the outer diameter. The hook portions 95 aid in retaining the permanent magnets 60 and inhibit movement of the magnets 60 in an outward radial direction. In other constructions, the hook portions 95 are not employed and other means, such as gluing, are employed to secure the magnets in place. The hook portions 95, if used, also play an electromagnetic role by partially closing the slots 90 above the magnets 60, thereby diminishing the variations of the magnetic field in the motor air-gap and reducing the cogging and/or ripple torque.

As illustrated in FIGS. 2–5, the permanent magnets 60 generally extend along the rotational axis 40 at a constant angular position. For example, the permanent magnet 60 that begins at the twelve-o-clock position at one end of the rotor 15 ends at the twelve-o-clock position at the opposite end of the rotor 15. However, in some constructions, it is desirable to skew the permanent magnets 60, in order to reduce the cogging and/or ripple torque. FIG. 6 illustrates one construction in which the permanent magnets 60 are substantially continuous but do not extend along the rotor 15 at a constant angular position. The permanent magnet 60 illustrated in FIG. 6 begins on the left side at about the three-o-clock position and ends on the right side at about the one-o-clock position.

Figure 7:
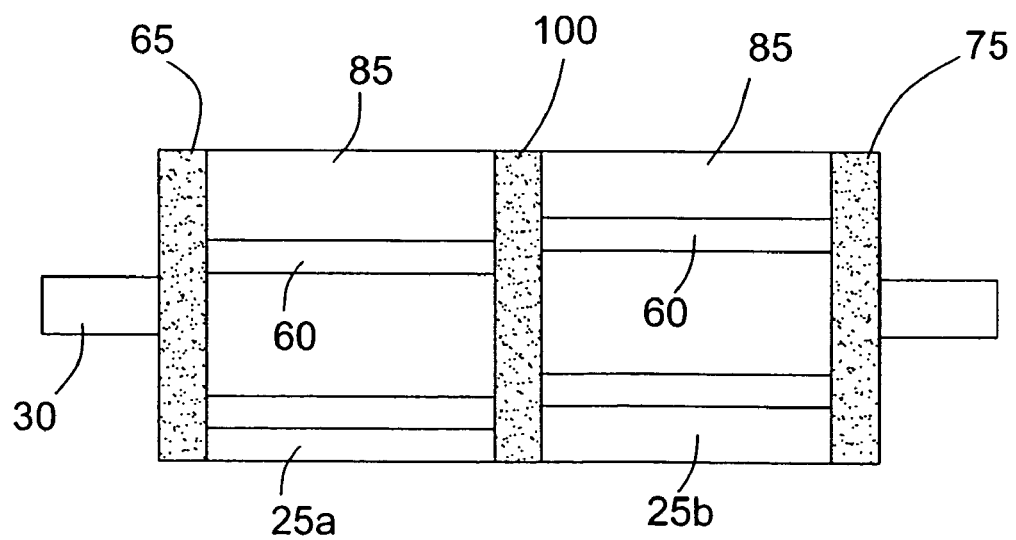
FIG. 7 is a schematic illustration of another rotor including rotor cores with an axial offset.

In another construction, illustrated in FIG. 7, an effective skew is achieved by offsetting two similar cores 25a, 25b. One core 25b is rotated about the rotational axis 40 by an angle (e.g., 10 degrees) to achieve the skew. Generally, a non-magnetic spacer or plate 100 is positioned between the two cores 25a, 25b to minimize the permanent magnet axial flux leakage. The spacer 100 could be formed in a manner similar to the first end portion 65 or the second end portion 70.

Each of the pole pieces 85 is generally made up of a plurality of laminations of a ferro-magnetic material, such as electrical grade steel. The laminations are generally stamped and attached to one another using a fastener, adhesive, or other suitable means. In other constructions, a single piece of material forms pole pieces 85. In these constructions, a powdered metal (iron) or soft magnetic composite may be used to form the component or it may be pressed to shape, sintered, machined, or otherwise formed.

The pole pieces 85 collect and concentrate the magnetic flux generated by the permanent magnets 60, which are typically tangentially magnetized. This structure of the magnetic circuit increases the motor specific torque output. In some constructions, the pole pieces 85 each include at least one interface surface that inhibits relative movement between the pole piece 85 and the adjacent permanent magnet 60. Such a construction enhances the rotor structural integrity and mechanical strength. For example, the pole pieces 85 may include a dovetail shaped extension, or tongue to better couple the pole pieces 85 and the permanent magnets 60.

The pole pieces 85 define a plurality of apertures (holes) 105 that extend through the pole pieces 85 in a direction that is substantially parallel to the rotational axis 40. In the construction illustrated in FIG. 3, each pole piece 85 defines three circular apertures 105. Of course more or fewer apertures 105 as well as apertures 105 of different sizes and/or shapes could be employed if desired.

With continued reference to FIG. 3, the first end portion 65 includes a first disc 110, an annular hub 115, and a plurality of pins 120. A plurality of fingers 125 (shown in FIG. 4) may be formed as part of the first disc 110 if desired. In some constructions, some of the elements, for example the annular hub 115 and/or the fingers 125, are absent. The first disc 110 has an outer diameter that is substantially equal to the outer diameter of the arranged pole pieces 85 and provides support for the remaining features of the first end portion 65. A shaft aperture extends through the first disc 110 to provide for passage of the rotor shaft 30. The preferred material for the end-portion 65 is a relatively hard plastic, which enhances the mechanical strength of the rotor 15. The end-portion 65 can be over molded on the shaft 30 and, if present, on the hub 75.

The annular hub 115 extends from the first disc 110 and, in some constructions, includes an inner diameter that defines a plurality of recesses 135. The recesses 135 are sized and shaped to engage the rotor hub 75 (see FIG. 5). Thus, the annular hub 115 and the first end portion 65 are coupled to the shaft 30 for rotation. While the construction of FIG. 3 illustrates semi-circular teeth 80 and recesses 135, one of ordinary skill in the art will realize that many other shapes could be used to couple the hub 75 and first end portion 65 for rotation. For example, another construction may include square-shaped teeth and recesses. Still other constructions may employ a dovetail arrangement. In yet other constructions, where the hub 75 is absent, the annular hub 115 can be directly attached to the shaft 30, preferably through an injection molding process.

The annular hub 115 also defines a plurality of outwardly-extending block portions 140 that extend from the outer diameter of the annular hub 115. Each of the block portions 140 corresponds with the slot 90 defined between two adjacent pole pieces 85. Thus, the annular hub 115 defines an innermost diameter of the slot 90 and engages the permanent magnet 60 installed within each of the slots 90.

In some constructions, the block portions 140 are dovetail shaped. The dovetail engages the adjacent pole pieces 85 and provides some restraint against the centrifugal forces that are produced during motor operation. Shapes other than dovetails could also be employed to both define the innermost diameter of the slot 90 and at least partially retain the adjacent slot pieces 85.

Each of the plurality of pins 120 extends from the first disc 110 through one of the apertures 105 defined in the pole pieces 85. In the illustrated construction of FIGS. 2–5, the pins 120 are cylindrical to match the circular apertures 105. In other constructions that use other shaped apertures 105, other shaped pins 120 that correspond with the apertures 105 would be employed. The construction of FIG. 3 illustrates a single pin 120 extending through one aperture 105 in each pole piece 85. In another construction, two or more pins 120 extend through apertures 105 in some or all of the pole pieces 85.

Figure 9:
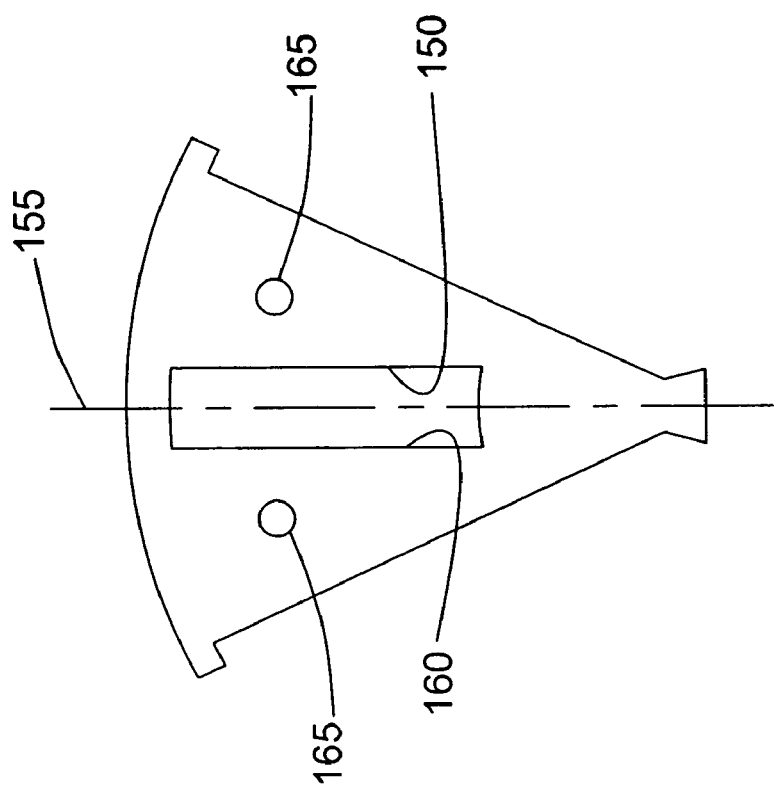
FIG. 9 is an end view of another pole piece including a rectangular opening and circular openings.
Figure 8:
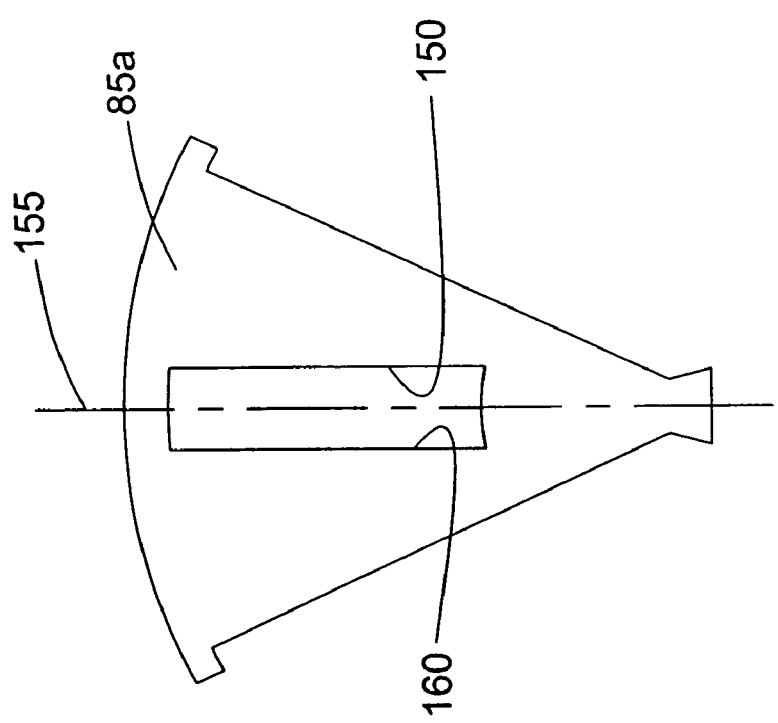
FIG. 8 is an end view of a pole piece including a rectangular opening.

As discussed, the number, size, and the shape of the pins 120 and apertures 105 can vary. For example, FIG. 8 illustrates a pole piece 85a that contains a substantially rectangular hole 150 placed on the center pole axis 155. A lug 160, which is attached to, or is an integral part of, the first end-portion 65 or the second end-portion 70 extends axially through the hole 150 and into the pole piece 85a. In some constructions the hole 150 can extend all the way to the upper surface of the pole piece 85a to define an open slot. Rectangular or polygonal holes 150 can also be used together with circular holes 165 as shown in FIG. 9. As described, plastic pins extend axially through the round holes 165. The lugs 160 provide a better fixture for assembling a plurality of pole pieces 85a and the magnets 60 and also improve the mechanical strength of the rotor assembly.

In one construction, the lug 160 is made of a non-magnetic material, e.g. plastic that is injection-molded together with the first end-portion 65 or the second end-portion 70. In this construction, the lug 160 also acts as a flux barrier in the magnetic path of the q-axis armature reaction field. The q-d saliency ratio is reduced and hence the potentially available reluctance torque is diminished. A motor including such a rotor construction has lower inductance and therefore the current commutation is improved. This improvement is particularly evident when the motor is operated as a brushless DC motor with quasi-square-wave currents.

In another construction, the lug 160 is made of a magnetic material, such as ferromagnetic steel or a soft magnetic composite with relatively high magnetic permeability. In this construction, the presence of the lug 160 has a reduced effect on the magnetic path of the q-axis armature reaction field when compared to a non-magnetic lug. In addition, the resulting motor has a relatively high q-d saliency that can be used to improve the specific torque output, especially when the motor is operated as a brushless AC motor with quasi-sine-wave currents.

Figure 5:
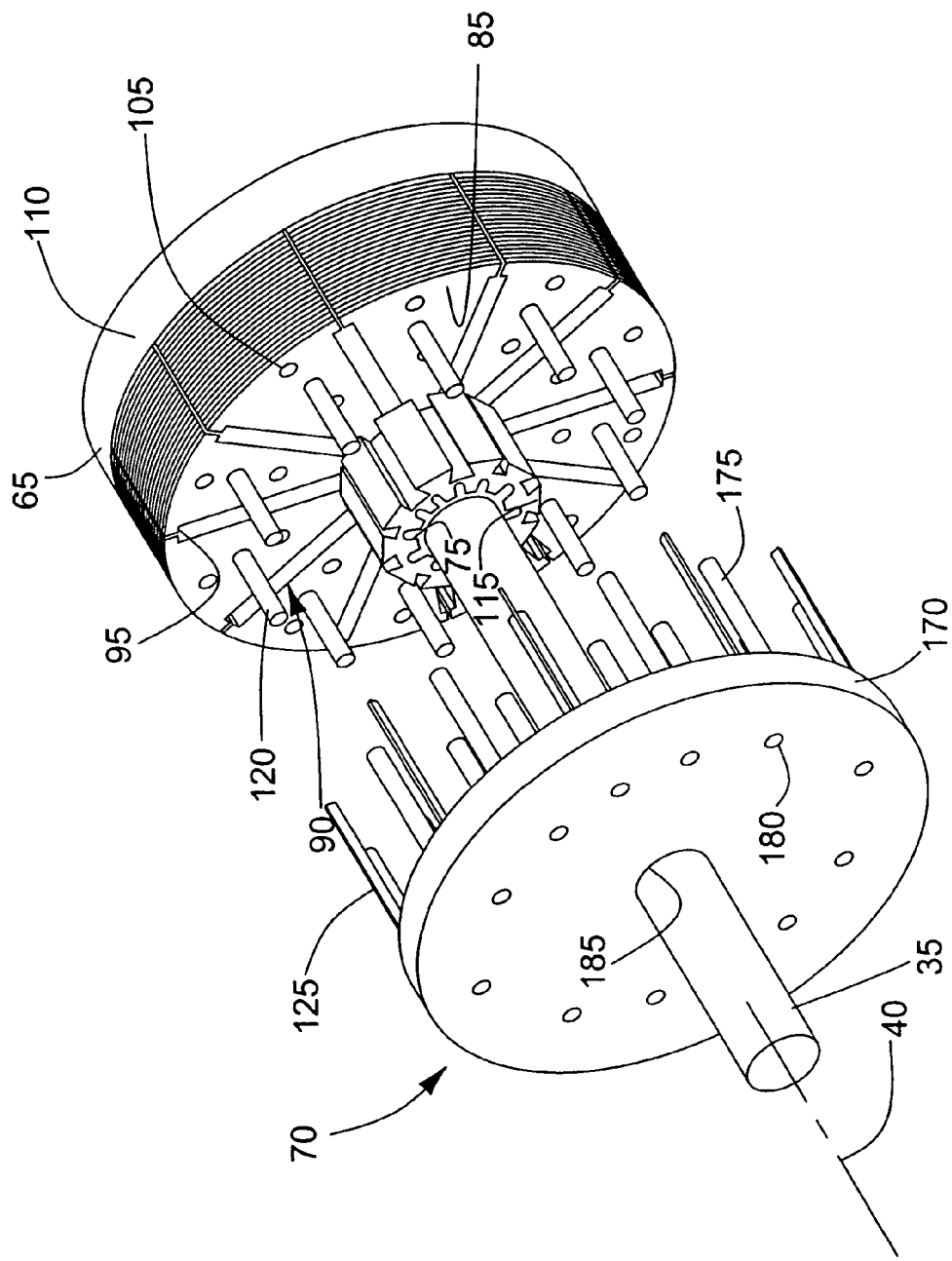
FIG. 5 is a partial exploded view of the rotor of FIG. 2 excluding magnets.
Figure 6:
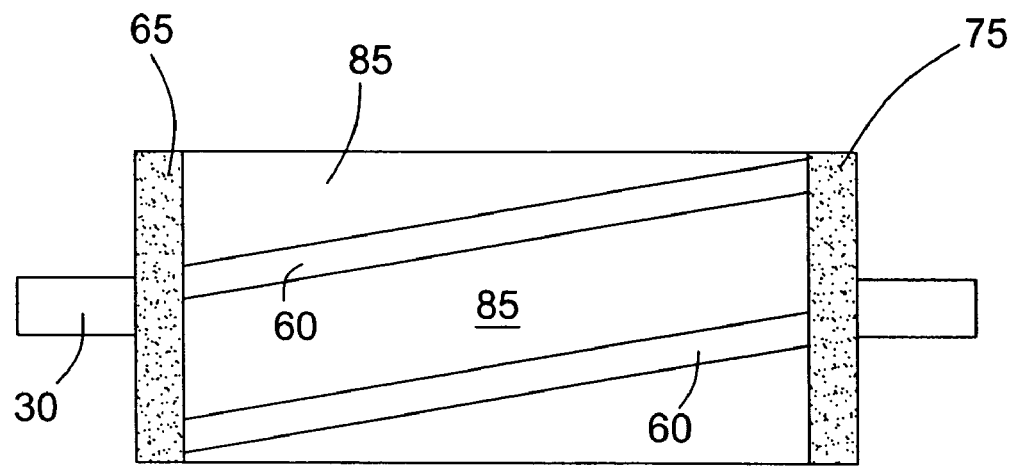
FIG. 6 is a schematic illustration of a rotor including skewed magnets.

With reference to FIG. 5, each of the fingers 125 extends from a second disc 170 and is positioned between two pole pieces 85 adjacent the hook portions 95. In some constructions the fingers 125 are formed as an integral part of the first end-portion 65 or the second end-portion 70. The fingers 125 cooperate with the block portions 140 to maintain the desired separation between two adjacent pole pieces 85 and insulate adjacent pole pieces 85 from one another. Thus, any two adjacent pole pieces 85 cooperate with one of the fingers 125 and one of the block portions 140 to define and surround the perimeter of a slot 90. The fingers 125 also separate the magnets 60 from the air-gap formed in between the stator and the rotor, and therefore enhance the environmental protection of the permanent magnet material.

Figure 4:
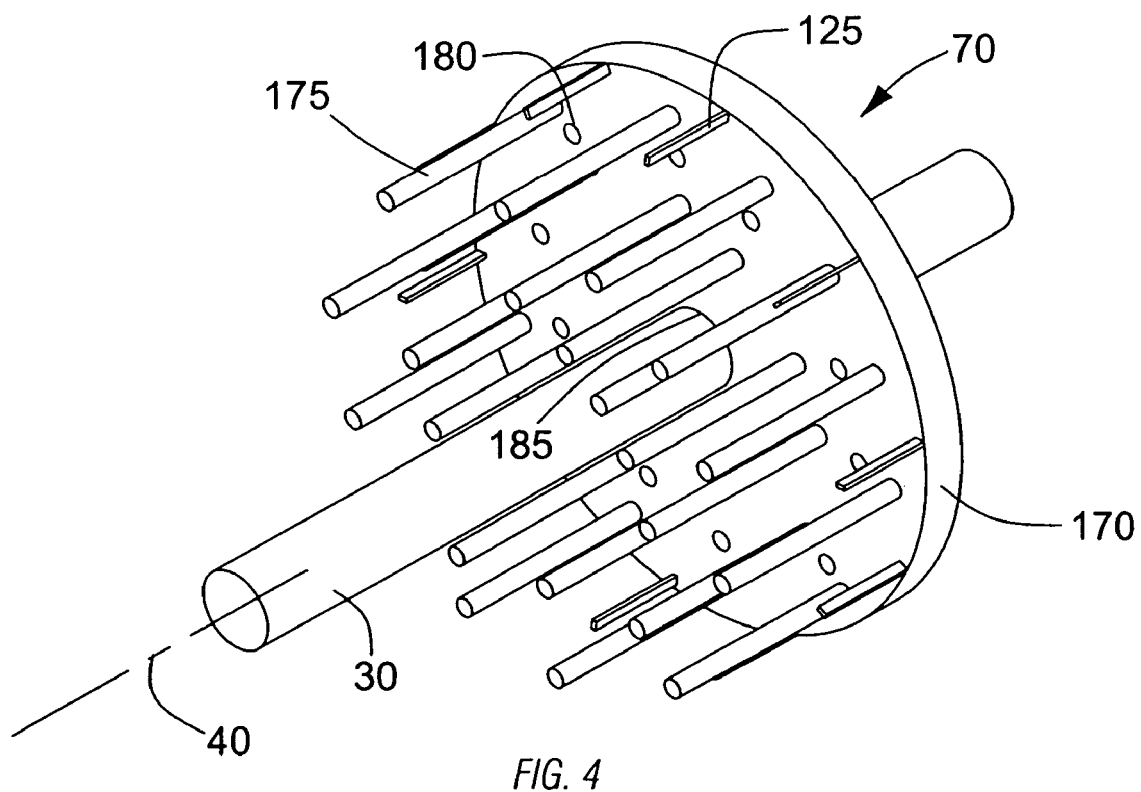
FIG. 4 is a perspective view of another portion of the rotor of FIG. 2.

Turning to FIG. 4, the second end portion 70 is illustrated. The second end portion 70 includes the second disc 170, a plurality of pins 175, a plurality of pin apertures 180, a rotor shaft aperture 185, and the fingers 125. It should be noted that the fingers 125 can be formed as part of the first disc 110 or the second disc 170, but only one set of fingers 125 is employed. The rotor shaft aperture 185 is sized to receive the rotor shaft 30 and allow the shaft 30 to pass through the disc 170. In some constructions, the disc 170 and the shaft 30 may include components or features that engage one another (similar to the central hub 75 and annular hub 115) to further couple the disc 170 and the shaft 30 for rotation. Preferably the end-portion 70 is formed by injection molding a relatively hard plastic.

Each of the plurality of pins 175 extends from the disc 170 and is sized and shaped to engage one of the apertures 105 defined by the pole pieces 85. As illustrated in FIG. 3, each pole piece 85 includes three apertures 105. One of the three apertures 105 engages the pin 120 that extends from the first disc 110. The remaining two apertures 105 receive the pins 175 illustrated in FIG. 4. The apertures 180 defined by the second disc 170 are sized, shaped, and positioned to receive the pins 120 that extend from the first disc 110. This arrangement provides for an interlocking relationship that couples and secures all of the components for rotation as a unitary body. As discussed, a different quantity of pins 175 and/or a different arrangement of pins 175 can be employed if desired. In addition, many shapes and sizes can be used for the pins 175 to enhance the mechanical and electromagnetic performance of the rotor 15 and motor 10. In some constructions, the plurality of pins 175 is absent, provided that satisfactory integrity of the rotor 15 is ensured by securing the pins 120 to the end-disc 170 through the apertures 180.

Figure 10:
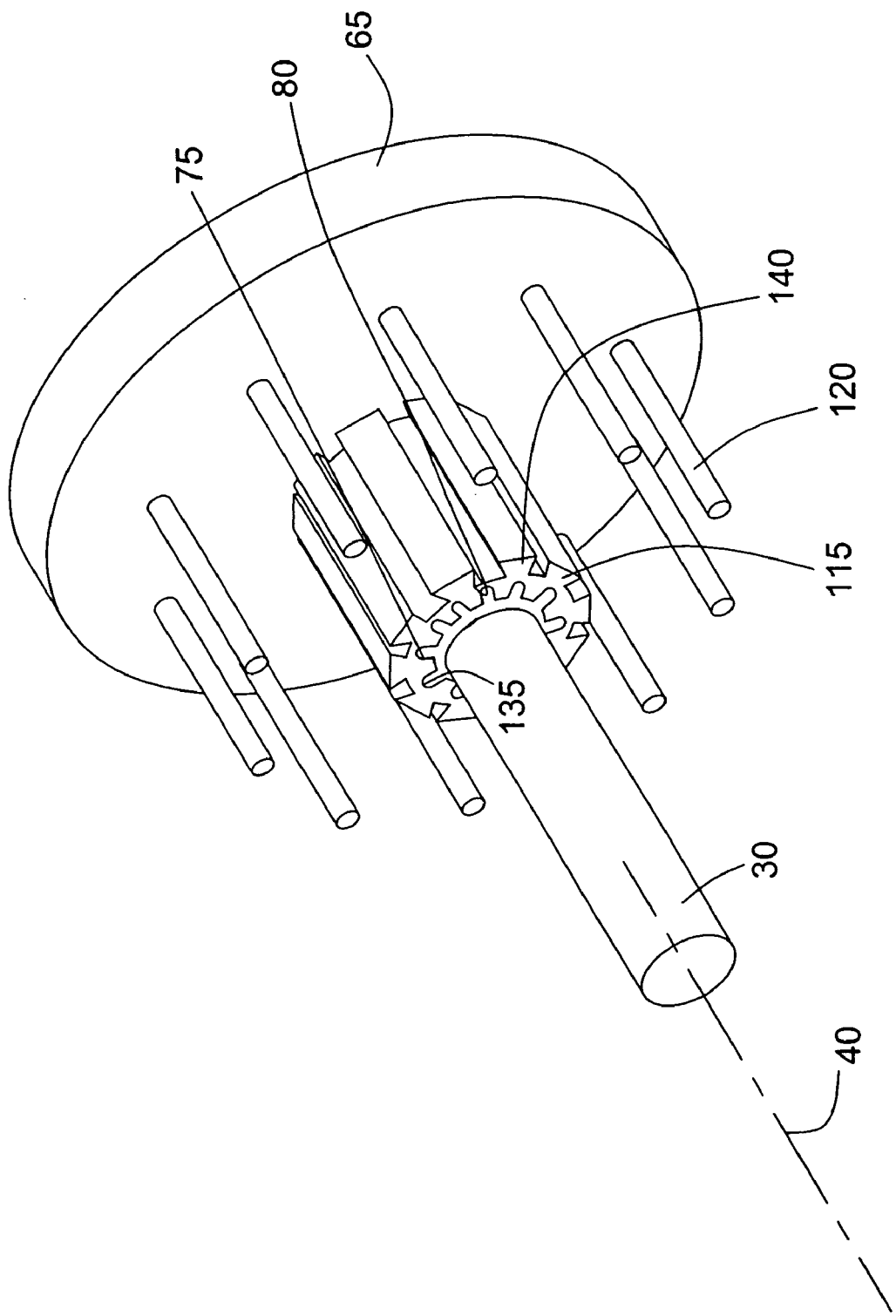
FIG. 10 is a perspective view of yet another portion of the rotor of FIG. 2.

Turning to FIGS. 5 and 10, the construction of the rotor 15 will be described. The first end portion 65 is preferably formed directly onto the shaft 30, and onto the hub 75 if present, from a plastic material using an injection molding process. However, other non-magnetic materials may be employed with other plastic forming processes also being suited for use. The first end portion 65 includes the pins 120 and the annular hub 115 and may include the fingers 125. Alternatively, the fingers 125 extend from the second end portion 70 as illustrated in FIGS. 4 and 5. The pole pieces 85 are stacked in place with each lamination sliding over the pin 120 and engaging the space between two adjacent blocks 140. The laminations may be fastened to one another or bonded as they are stacked or after stacking is complete. In another construction, the laminations are stacked and attached or bonded to one another to define a complete pole piece 85, which is then slid over the pin 120. In constructions that employ a solid or one-piece pole piece 85, the pole piece 85 is slid over the pin 120 to position it in the rotor 15. The permanent magnets 60 are positioned within each of the slots 90 as the pole pieces 85 are being positioned or after all of the pole pieces 85 have been positioned. The method described is especially suitable if pre-magnetized magnets 60 are used, in which case the end-portion 65 also serves as a convenient manufacturing fixture.

In constructions that do not form the fingers 125 as part of the first end portion 65 or the second end-portion 70, insertable fingers 125 may be used. The insertable fingers 125 can be positioned between adjacent pole pieces 85 as the pole pieces 85 are positioned around the rotor shaft 30.

The first end portion 65, pole pieces 85, permanent magnets 60, and in the preferred construction, the rotor shaft 30 are positioned within a mold to form the second end portion 70. The second end portion 70 is formed from a plastic material using an injection molding process. During the molding process, the pins 175 that extend from the second disc 170 form, as do the apertures 180 that surround the pins 120 that extend from the first disc 110. The pins 175 bond with the first end portion 65 as they form, while the apertures 180 bond with the pins 120 that extend from the first disc 110 as the apertures 180 are formed. The molded plastic may also extend and form the fingers 125 and cover the core 25 and the first end portion 65 if desired. Generally, the plastic is free to flow into, and fill any empty spaces within the mold. In another construction, suitable for small rotors, the second end-portion 70 is separately formed and consists only of the non-magnetic disc 170 with the shaft aperture 185 and the pin apertures 180. In this case, the end-portion 70 is attached to the rotor and heat is used to bond the plastic to the end-portion 70, the shaft 30 and the pins 120.

Following the molding steps, any necessary machining may be performed to arrive at a rotor 15 having the desired dimensions to assure proper operation within an electric machine such as the motor 10 of FIG. 1.

It should be noted that some or all of the component surfaces may include engaging features or may be otherwise roughened to enhance the engagement between the particular component and any molded plastic. For example, the rotor shaft 30 may be knurled to enhance its engagement with the hub and/or the end portions 65 and 70.

In another construction, especially suitable if non-magnetized magnets 60 are employed, the pole pieces 85, the permanent magnets 60, and the shaft 30, are arranged in their operating positions and retained in a fixture within a mold and the first end portion 65 and the second end portion 70 are simultaneously formed in a single forming step. In preferred constructions, the forming step includes injection molding. The plastic, or other injectable material, fills all of the open voids in the components and bonds the pole pieces 85, the permanent magnets 65, and the rotor shaft 30 together.

The manufacturing processes described establish a chemical or molecular bond between the first end portion 65 and the second end portion 70. This bond provides the strength necessary to complete the rotor assembly. In addition, the pole pieces 85 and permanent magnets 60 are substantially sealed within the plastic or other injectable material, thus providing some protection from damage as well as from dirt or other contaminants.

Thus, the invention provides, among other things, a new and useful rotor 15 for an electric machine such as an electric motor 10 and a method of assembling the rotor 15. The constructions of the rotor 15 and the methods of assembling the rotor 15 described above and illustrated in the figures are presented by way of example only and are not intended as a limitation upon the concepts and principles of the invention. Various features and advantages of the invention are set forth in the following claims.

What is claimed is:

1. A rotor comprising:
a shaft defining a rotor axis;
a first end portion coupled to the shaft;
a pole piece defining an aperture therethrough; and
a second end portion positioned to dispose the pole piece between the first end portion and the second end portion, a portion of one of the first end portion and the second end portion extending through the aperture and bonding with the other of the first end portion and the second end portion, wherein the pole piece is a first pole piece of a plurality of pole pieces, each pole piece including an aperture therethrough and arranged circumferentially around the shaft, wherein the first end portion further comprises a plurality of pins integrally-formed as part of the first end portion, and wherein each of the pins extends though one of the apertures, and wherein the first end portion comprises a plurality of fingers having a first side and a second side, the first side in contact with one of the plurality of pole pieces and the second side in contact with an adjacent one of the plurality of pole pieces.

2. A rotor as set forth in claim 1 wherein each of the plurality of pole pieces cooperates with an adjacent pole piece to define a slot, and wherein each slot is at least partially filled with a permanent magnet material to define a permanent magnet spoke.

3. A rotor as set forth in claim 1 wherein at least one of the first end portion and the second end portion is molded from a plastic material.

4. An electric machine comprising:
a stator;
a rotor disposed to interact with the stator, the rotor comprising;
a shaft extending along a rotor axis;
a first end portion coupled to the shaft;
a plurality of pole pieces arranged circumferentially around the shaft, each of the plurality of pole pieces defining an enclosed aperture therethrough; and
a second end portion positioned to sandwich the plurality of pole pieces between the first end portion and the second end portion, a portion of one of the first end portion and the second end portion extending through each of the apertures and bonding with the other of the first end portion and the second end portion; and
a bearing at least partially supporting the rotor shaft for rotation about the rotor axis, wherein the first end portion comprises a plurality of pins integrally-formed as part of the first end portion, and wherein each of the pins extends though one of the apertures, and wherein the first end portion comprises a plurality of fingers having a first side and a second side, the first side in contact with one of the plurality of pole pieces and the second side in contact with an adjacent one of the plurality of pole pieces.

5. A rotor as set forth in claim 4 wherein each of the plurality of pole pieces cooperates with an adjacent pole piece to define a substantially rectangular slot, and wherein each slot is at least partially filled with a permanent magnet material to define a permanent magnet spoke.

6. A rotor as set forth in claim 4 wherein at least one of the first end portion and the second end portion is molded from a plastic material.

7. A rotor comprising:
a shaft defining a rotor axis;
a first end portion coupled to the shaft;
a pole piece defining an enclosed aperture therethrough;
a second end portion positioned to dispose the pole piece between the first end portion and the second end portion, a portion of one of the first end portion and the second end portion extending through the aperture and bonding with the other of the first end portion and the second end portion;
a hub at least partially surrounding and in contact with the shaft, the hub disposed between the shaft and the pole piece; and
an annular hub at least partially surrounding and in contact with the hub, the annular hub disposed between the hub and the pole piece.

8. A rotor as set forth in claim 7 wherein the hub is formed from a first material and the annular hub is formed from a second material different from the first material.

9. A rotor as set forth in claim 7 wherein the hub is formed from a plastic material and the annular hub is formed from a plastic material.

10. A rotor as set forth in claim 7 wherein the hub is made of injected molded plastic simultaneously formed with at least one of the first end portion and the second end portion.

11. A rotor as set forth in claim 7 wherein each of the plurality of pole pieces cooperates with an adjacent pole piece to define a substantially rectangular slot, and wherein each slot is at least partially filled with a permanent magnet material to define a permanent magnet spoke.

12. A rotor as set forth in claim 7 wherein at least one of the first end portion and the second end portion is molded from a plastic material.

13. A rotor comprising:
a shaft defining a rotor axis;
a plurality of pole pieces each defining a first end, a second end, and at least two apertures extending from the first end to the second end;
a first end portion coupled to the shaft and disposed adjacent the first end;
a second end portion coupled to the shaft and disposed adjacent the second end, the second end portion extending through the at least two apertures to bond with the first end portion such that the first end portion and the second end portion together define a single inseparable component, wherein the first end portion comprises a plurality of fingers having a first side and a second side, the first side in contact with one of the plurality of pole pieces and the second side in contact with an adjacent one of the plurality of pole pieces.

14. A rotor as set forth in claim 13 wherein each of the plurality of pole pieces cooperates with an adjacent pole piece to define a substantially rectangular slot, and wherein each slot is at least partially filled with a permanent magnet material to define a permanent magnet spoke.

15. A rotor as set forth in claim 13 wherein at least one of the first end portion and the second end portion is molded from a plastic material.

16. A rotor comprising:
a shaft defining a rotor axis;
a first end portion coupled to the shaft;
a pole piece defining an aperture therethrough;
a first pin integrally-formed as part of the first end portion, the first pin extending through the aperture; and
a second end portion positioned to dispose the pole piece between the first end portion and the second end portion, the first pin extending through the aperture and bonding with the second end portion, wherein the first pin is intimately bonded to the second end portion and the second pin is intimately bonded to the first end portion.

17. A rotor comprising:
a shaft defining a rotor axis;
a first end portion coupled to the shaft;
a pole piece defining an aperture therethrough;
a first pin integrally-formed as part of the first end portion, the first pin extending through the aperture; and
a second end portion positioned to dispose the pole piece between the first end portion and the second end portion, the first pin extending through the aperture and bonding with the second end portion, wherein the pole piece includes a second aperture and wherein the second end portion includes a second pin integrally-formed as part of the second end portion, the second pin extending through the second aperture.

18. An electric machine comprising:
a stator;
a rotor disposed to interact with the stator, the rotor comprising;
a shaft extending along a rotor axis;
a first end portion coupled to the shaft;
a plurality of pole pieces arranged circumferentially around the shaft, each of the plurality of pole pieces defining an aperture therethrough;
a plurality of first pins integrally-formed as part of the first end portion, each of the plurality of first pins extending through the aperture of one of the pole pieces; and
a second end portion positioned to sandwich the plurality of pole pieces between the first end portion and the second end portion, each of the plurality of first pins extending through one of the apertures and bonding with the second end portion; and
a bearing at least partially supporting the rotor shaft for rotation about the rotor axis, wherein each of the plurality of first pins is intimately bonded to the second end portion and each of the plurality of second pins is intimately bonded to the first end portion.

19. An electric machine comprising:
a stator;
a rotor disposed to interact with the stator, the rotor comprising;
a shaft extending along a rotor axis;
a first end portion coupled to the shaft;
a plurality of pole pieces arranged circumferentially around the shaft, each of the plurality of pole pieces defining an aperture therethrough;
a plurality of first pins integrally-formed as part of the first end portion, each of the plurality of first pins extending through the aperture of one of the pole pieces; and
a second end portion positioned to sandwich the plurality of pole pieces between the first end portion and the second end portion, each of the plurality of first pins extending through one of the apertures and bonding with the second end portion; and a bearing at least partially supporting the rotor shaft for rotation about the rotor axis, wherein each of the plurality of pole pieces includes a second aperture and wherein the second end portion includes a plurality of second pins integrally-formed as part of the second end portion, each of the second pins extending through the second aperture of one of the pole pieces.

* * * * *